J. G. JONES.
ELECTRIC LIGHT BRACKET.
APPLICATION FILED MAY 2, 1919.
1,340,273.
Patented May 18, 1920.
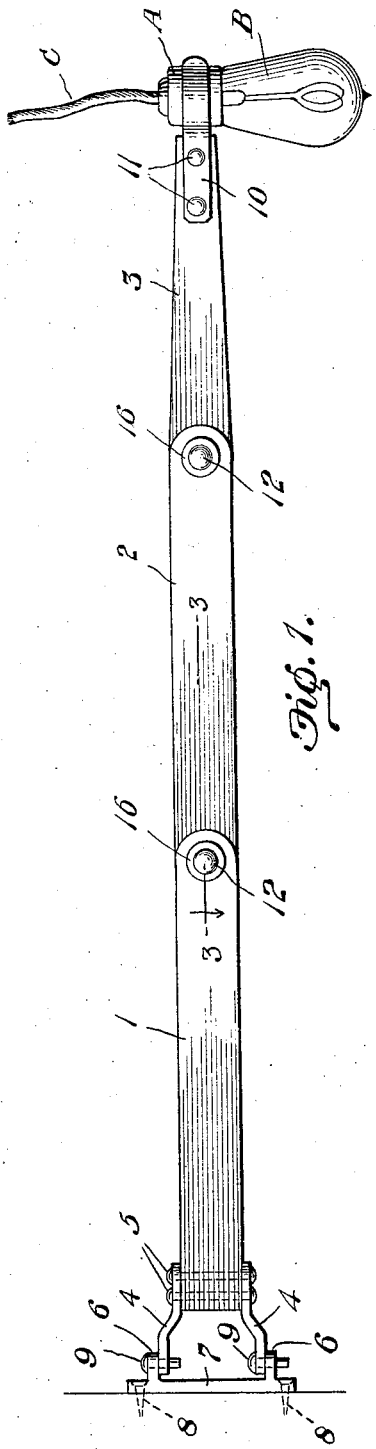
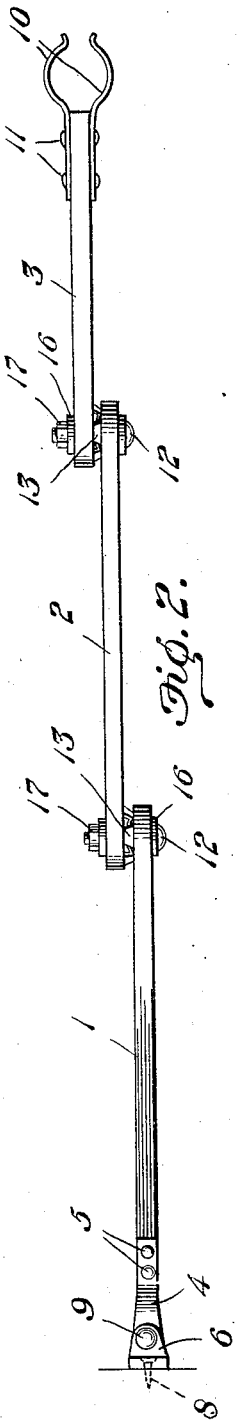
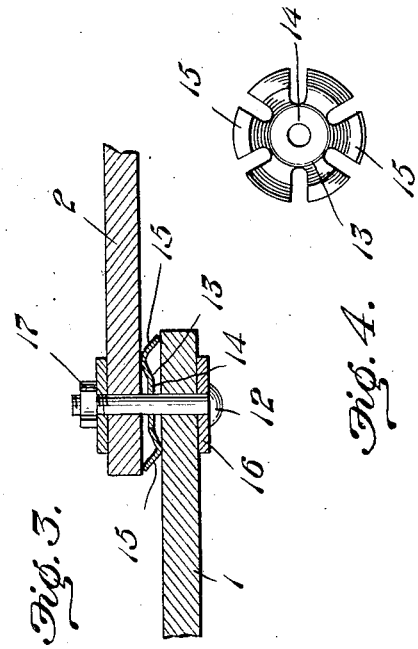
INVENTOR
John G. Jones.
Frease, Merkel, Saywell and Bond
ATTORNEYS.

UNITED STATES PATENT OFFICE.

JOHN G. JONES, OF DETROIT, MICHIGAN.

ELECTRIC-LIGHT BRACKET.

1,340,273.  Specification of Letters Patent.  Patented May 18, 1920.

Application filed May 2, 1919. Serial No. 294,137.

*To all whom it may concern:*

Be it known that I, JOHN G. JONES, a citizen of the United States, residing at Detroit, in the county of Wayne and State of Michigan, have invented a new and useful Electric-Light Bracket, of which the following is a specification.

The invention relates to improvements in extensible electric light brackets and more especially to what might be termed an auxiliary bracket designed to be connected to a wall or desk and to support an electric light hanging from a cord connected to a socket in the ceiling.

The objects of the invention are to provide an extensible electric light bracket of the character referred to which relieves the strain upon the ceiling socket due to the weight of the cord, incandescent bulb and shade; to provide a bracket which is quickly and easily adjusted either vertically or horizontally; to provide friction means for holding the bracket in any desired adjustment; and to generally improve and simplify extensible electric light brackets.

With these objects in view the invention consists in the novel construction and arrangement of parts, hereinafter described, illustrated in the accompanying drawings, and particularly pointed out in the appended claim, it being understood that various changes in the form, proportions, size and minor details of construction may be made within the scope of the appended claim, without departing from the spirit or sacrificing any of the advantages of the invention.

The invention thus set forth in general terms is illustrated in the accompanying drawings forming part hereof, in which—

Figure 1 is a side elevation of an electric light bracket, embodying the invention;

Fig. 2, a plan view of the same;

Fig. 3, an enlarged section on the line 3—3, Fig. 1;

Fig. 4, a detail view of the spring washer used in the joints of the bracket.

A practical embodiment of the invention is disclosed in the accompanying drawings, forming a part of this specification in which similar numerals of reference indicate corresponding parts throughout the several views.

The bracket is made up of a plurality of arms, three being shown in the accompanying drawings, pivotally connected together at their extremities and provided with a friction joint, a hinged friction joint being provided upon the end of the inner arm for connection to a wall or the like and a pair of spring clips upon the free end of the outer arm to receive the lamp socket.

The bracket illustrated comprises the inner arm 1, the intermediate arm 2 and the outer arm 3 pivoted together at their extremities and provided with friction joints, the arms being preferably formed of wood. The inner arm 1 has connected to its inner or pivoted extremity a pair of oppositely disposed fingers 4 connected to the arm by means of rivets 5 or their equivalents, said fingers being preferably of the form best illustrated in Fig. 1 and stamped from metal having sufficient spring to cause them to frictionally engage the ears 6 of the attaching bracket 7 which is connected to the wall by means of screws 8. Pins 9 are passed through registering apertures in the ears 6 and fingers 4 pivotally mounting the electric light bracket upon the attaching bracket 7.

A pair of spring clips 10 are connected to the free end of the outer arm 3 by means of rivets 11 or their equivalents, thus forming a resilient lamp socket clamp of proper size to snugly embrace the lamp socket "A" of the incandescent bulb "B" which is suspended from a suitable socket in the ceiling by means of the usual flexible cord "C".

As best illustrated in Fig. 1 this clamp is arranged to hold the lamp at a proper height to carry the entire weight of the lamp upon the bracket, thus allowing slack in the flexible cord "C" and relieving the socket in the ceiling from all strain due to the weight of the lamp.

In order to provide friction joints between the several arms of the bracket spring washers are provided around the pivotal bolts 12. In Figs. 3 and 4 is illustrated the preferred form of spring washer, indicated by the numeral 13. This washer comprises what might be termed a two-way spring washer and comprises the central disk portion 14 and a plurality of radial, oppositely disposed cusps 15 which are bent alternately up and down. One of these spring washers is placed between the adjacent arms upon the bolt 12, metal washers 16 being provided around the bolt upon the outer faces of the arms and an adjusting nut 17 is provided upon the screw threaded extremity of each bolt. By tightening this nut sufficiently the proper tension may be placed upon the two-way spring washer to cause the arms to remain in any adjusted position, holding the lamp at any desired height.

From the above description and an inspection of the accompanying drawings it will be seen that a bracket is thus produced, which receives the entire weight of the lamp relieving the ceiling socket of all strains and it may be moved into any desired vertical or horizontal position and frictionally held in this position, thus allowing for any desired adjustment of the light.

Although the drawings and above specification disclose the best mode in which I have contemplated embodying my invention I desire to be not limited to the details of such disclosure, for in the further practical application of my invention, many changes in form and construction may be made, as circumstances require or experience suggests, without departing from the spirit of the invention, within the scope of the appended claim.

I claim—

In a lamp bracket of the character described comprising a plurality of arms pivotally joined together, a friction joint between said arms comprising a spring washer provided with a plurality of radial cusps, each cusp being bent at an angle to engage one of the arms and then at an angle to engage the other arm, alternate cusps being bent in opposite directions.

In testimony that I claim the above, I have hereunto subscribed my name.

JOHN G. JONES.